United States Patent [19]

Malinski et al.

[11] 4,114,078

[45] Sep. 12, 1978

[54] MECHANICAL TORQUE LIMIT FOR VALVE ACTUATOR

[76] Inventors: Richard F. Malinski, 200 Beech Dr., Schaumburg, Ill. 60172; Aubrey C. Childers, 2070 Coral Ave., Aurora, Ill. 60506

[21] Appl. No.: 761,596

[22] Filed: Jan. 24, 1977

[51] Int. Cl.² .......................... H02H 7/08; H02P 3/00
[52] U.S. Cl. .................................. 318/475; 318/434; 307/124
[58] Field of Search ............... 318/434, 475; 307/119, 307/120, 124; 200/61.46

[56] References Cited

U.S. PATENT DOCUMENTS

| | | | |
|---|---|---|---|
| 2,062,905 | 12/1936 | Hilty et al. | 318/475 |
| 3,132,730 | 5/1964 | Dahlstrand et al. | 200/61.46 |
| 3,423,661 | 1/1969 | Gustafson | 318/475 |
| 3,524,526 | 8/1970 | Denkowski | 318/475 |
| 3,553,557 | 1/1971 | Korthaus et al. | 318/475 |
| 3,599,067 | 8/1971 | Wallis | 318/475 |
| 3,891,908 | 6/1975 | Porras | 318/434 |

*Primary Examiner*—Robert K. Schaefer
*Assistant Examiner*—Eugene S. Indyk
*Attorney, Agent, or Firm*—Hill, Gross, Simpson, Van Santen, Steadman, Chiara & Simpson

[57] ABSTRACT

An electrically energized actuator for operating a valve has an output shaft for connection to a rotatable valve stem and is driven, via a gear train, by an electrically energized motor. A safety shut off mechanism is responsive to a predetermined resistance to rotation of the output shaft to operate an electric switch which prevents further operation of the drive motor.

11 Claims, 7 Drawing Figures

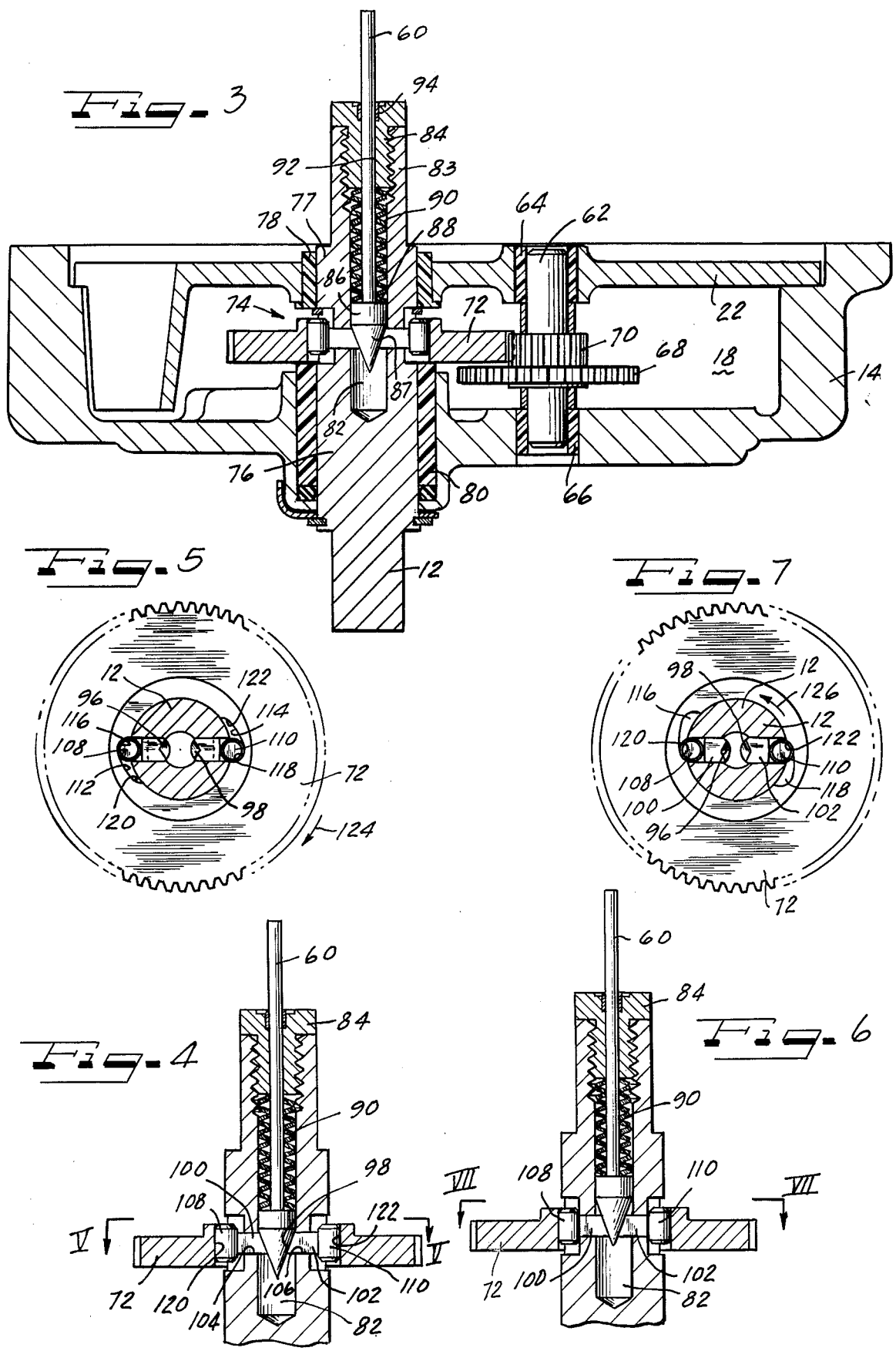

4,114,078

MECHANICAL TORQUE LIMIT FOR VALVE ACTUATOR

BACKGROUND OF THE INVENTION

1. Field of the Invention

This invention relates to valve actuators, and more particularly to a safety shut off mechanism for valve actuators.

2. Description of the Prior Art

The art generally recognizes a wide variety of and various applications for motor driven valves. The motor mechanism for driving a valve usually comprises an electric, pneumatic or hydraulic prime mover which is coupled to an output shaft that is mounted for rotation or reciprocation, by way of an intermediate mechanism, such as a gear train. U.S. Pat. No. 3,572,163, of Malcolm D. Clark, issued Mar. 23, 1971, discloses electrically energized actuators for both light and heavy-duty applications. Each of the actuators disclosed by Malcolm D. Clark are of the same general type as the actuator disclosed herein, with respect to general construction and operation. Those inventions, however, were directed to mehcanisms for disengaging the motor from the output shaft so that the actuators could be operated by hand. These prior art patents are fully incorporated herein by this reference.

SUMMARY OF THE INVENTION

Although the mechanisms of Clark are highly advantageous as safety devices in preventing injury to workmen in manually operating the valve actuators during power failures of indeterminate intervals, it has been found that situations arise wherein an actuator encounters a resistance torque on the output shaft during operation which can injure the actuator.

It is therefore the primary object of the invention to provide a valve actuator which includes a safety shut off mechanism to protect the valve actuator in response to resistance of rotation of the output shaft which reaches a predetermined value.

A more particular object of the invention is to prevent operation of the drive motor in response to the occurrence of a predetermined resistance to rotation of the output shaft.

According to the invention, the output shaft of an actuator is driven by an electric drive motor by way of a gear train. A switch is mounted adjacent the end of the output shaft which is not connected to the valve, the switch being electrically connected in circuit with the drive motor.

The output shaft includes an axial bore and a transverse bore intersecting the axial bore. A rod is axially movable in the axial bore and is spring loaded as to be urged toward the valve end of the output shaft. The rod carries a conically shaped member which engages complementary shaped surfaces of a pair of pins which extend radially therefrom through the transverse bore. The pins each have distal ends of circular cross section which seat into detents in the surface of the inner diameter of the last gear of the gear train which is carried out the output shaft. The detents develop into elongate arcuate surfaces which function as cams to press the pins inwardly against the conical member carried by the rod and, upon the occurrence of a predetermined resistance to rotation of the output shaft, overcome the bias on the rod to force the rod axially in the direction away from the valve end of the output shaft to operate the switch and terminate operation of the drive motor.

BRIEF DESCRIPTION OF THE DRAWINGS

Other objects, features and advantages of the invention, its organization, construction and operation will be best understood from the following detailed description taken in conjunction with the accompanying drawings, on which:

FIG. 3 is an elevational section of the apparatus of FIG. 2, taken below the electrical components and generally along the line III—III, and particularly illustrating the safety shut off mechanism of the present invention;

FIG. 4 is a portion of FIG. 3 showing the torque responsive safety shut off mechanism in a normal driving condition;

FIG. 5 is a sectional view taken generally along the line V—V of FIG. 4;

FIG. 6 is a view similar to FIG. 4 showing the torque responsive safety shut off mechanism in the motor shut off condition; and FIG. 7 is a sectional view taken generally along the line VII—VII of FIG. 6.

DESCRIPTION OF THE PREFERRED EMBODIMENT

Figure 1:
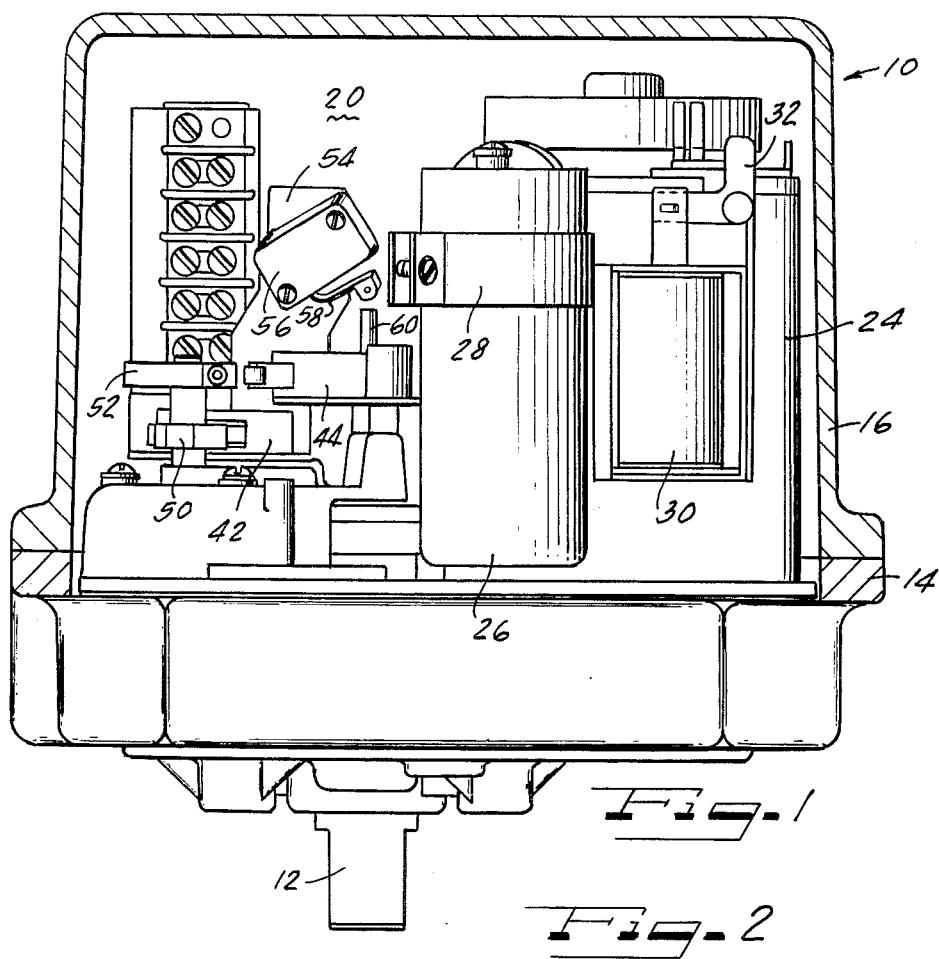
FIG. 1 is an elevational view, partially in section, of an electrically energized actuator for a valve embodying the principles of the present invention.
Figure 2:
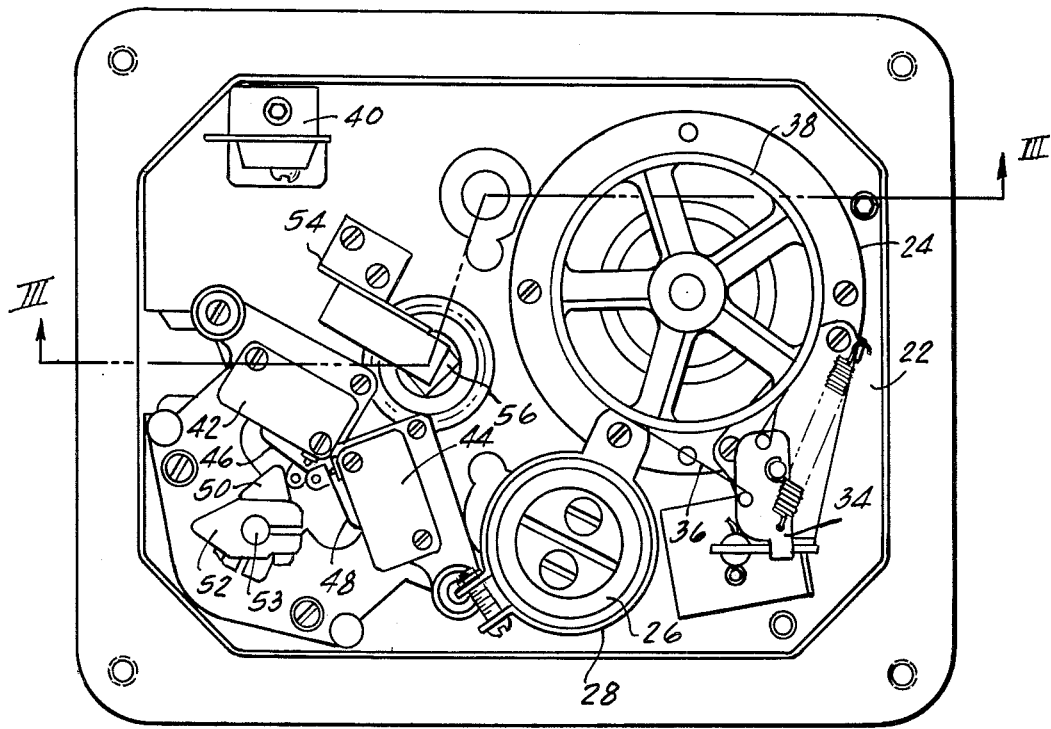
FIG. 2 is a top plan view of the apparatus of FIG. 1 with the housing cover removed.

Referring first to FIGS. 1 and 2, an actuator is generally illustrated at 10 as comprising an output shaft 12 extending from a lower housing 14 and an upper or cover housing 16. The lower housing 14 generally defines a chamber 18 (FIG. 3) for housing the gear train of the actuator, while the cover housing 16 defines a chamber 20 for housing the electrical components of the actuator.

A mounting plate 22 is carried on a shoulder of the housing 14 (FIG. 3) for mounting the gear train in the chamber 18 and for mounting the electrical components in the chamber 20.

An electric drive motor 24 is mounted on the plate 22 in the chamber 20 and carries, by way of a mounting strip 28, a capacitor 26. The motor 24 may therefore be a capacitive-start motor and have the capacitor 26 connected in circuit therewith for starting purposes.

An electromagnetic brake solenoid 30 is also mounted on the motor as part of a brake mechanism which includes a pivotal arm 32 for pivoting a spring-bias plate 34 to release a brake which comprises a brake band 36 which embraces a brake drum 38 carried on the motor shaft. In FIG. 2 it is clear that the solenoid 30 is energized with the motor 24 so as to release the brake during motor operation. This structure will not be discussed in greater detail in that the same is fully disclosed in U.S. Pat. No. 3,808,895, issued May 7, 1974 to John Herman Fitzwater, which is fully incorporated herein by this reference.

The plate 22 also mountes a terminal strip 40 for receiving and distributing incoming electrical leads to the electrical components of the actuator, as is well known in the art.

A pair of limit switches 42 and 44, one for each direction of driving, are also carried at different levels above the plate 22. The limit switch 42 includes an operating lever 46 for engagement by a cam 50 and the limit switch 44 includes an operating lever 48 for engagement by a cam 52, the cams 50 and 52 being fixed for rotation with the shaft 53 which, in turn, is connected to the drive motor by a gear train (not shown) to relate motor shut off limits to revolutions of the motor and the output shaft. Ordinarily, the shaft 53 rotates through an angle of greater than 90°; however, any angular displacement of the output shaft may be related to the number of revolutions of the drive motor by way of a gear train and the limit switches similarly related. Therefore, the gearing between the shaft 53 and the motor may be replaced, as a unit, for a particular ratio, and as can be seen in FIG. 2 the cams 50 and 52 are adjustable on the shaft 53 for a fine adjustment of the selected ratio.

A bracket 54 mounts a switch 56 to the plate 22 in a position such that a switch operator 58 is disposed directly adjacent a rod 60. The switch 56 is connected in circuit with the motor 24 so that in its normal or unoperative condition the switch 56 permits operation of the motor and in its operated condition (via the rod 60) prevents operation of the motor 24. The switch 56 may therefore be connected in series with the motor and be a normally closed switch, or may be connected in series with a load device, the series combination being connected in parallel with the motor and the switch being a normally opened switch which is operable to bypass the motor. The most simple case is, of course, a serial connection of the switch and the motor.

Referring now to FIGS. 3-7, a gear train comprises a gear 68 which is either directly, or through other gears, engaged with a gear on the output shaft of the motor 24. The gear 68 is mounted with a gear 70 on a shaft 62 which is rotatably mounted at 64 in the plate 22 and in the housing 14 at 66. The gear 70 engages a gear 72 which is carried about the output shaft 12 and which forms a part of the torque responsive safety shut off mechanism 74.

The output shaft 12 includes a portion 76 which is rotatably mounted at 80 in the housing 14 and a portion 77 which is rotatably mounted in the plate 22 at 78.

The output shaft 12 includes an axial bore 82 with a threaded portion 83 for receiving a threaded retaining nut 84. The threaded retaining nut includes an axial bore 92 for receiving the rod 60 therethrough for axial movement and carries a sealing bearing 94 for slidable engagement with the rod 60. A member 86 is carried at the lower end of the rod, as viewed in FIG. 3, and has a lower conical surface 87 and an upper flat surface 88. Biasing means including a spring 90, here in the form of a spring washer, bears against the surface 88 and the lower surface of the retaining nut 84 to urge the rod 60 downwardly.

Referring more specifically to FIGS. 4-7, the conical surface 87 bears against a pair of complementary shaped surfaces 96 and 98 of respective sliders 100 and 102 (in the form of pins) which are mounted in a transverse bore which intersects the axial bore 82 of the output shaft 12. The transverse bore includes a pair of radially extending bores 104 and 106 which receive the slider 100 and 102, respectively.

The slider 104 has a cylindrical pin 108 connected to the end opposite the surface 96 and the slider 102 has a cylindrical pin 110 connected to the end opposite the surfce 98. The cylindrical pins 108 and 110 are received in respective detents 112 and 114 of the inner diameter of the gear 72. The detents 112 and 114 are elongate and have a circular shaped portion 116 and 118, respectively, which develop into arcuate ramp surfaces 120 and 122, respectively.

Assuming the direction of rotation indicated by the narrow 124 in FIG. 5, and assuming no obstruction or other abnormal resistance to rotation of the shaft 12, the force of the spring 90 causes the cylindrical elements 108 and 110 to be seated in the respective circular portions 116 and 118 of the detents 112 and 114, respectively.

If, however, a predetermined amount of resistance to rotation of the shaft 12 occurs, so that there is relative rotation of the shaft 12 with respect to the gear 72, as indicated by the arrow 126 in FIG. 7, the ramps 120 and 122 act as cams and the cylindrical elements 108 and 110 act as cam followers to push the sliders 100 and 102 inwardly, as illustrated in FIGS. 6 and 7. The surfaces 96 and 98 then, in turn, act as cams and the conical surface 87 acts as a cam follower to move the rod 60 upwardly so that the upper end thereof engages the switch operator 58 to operate the switch 56 and terminate operation of the motor 24.

The foregoing discussion of operation relates only to driving in one direction. The same structure may be utilized with oppositely directed ramp portions of the detents for a torque responsive shut down during driving in the opposite direction.

Although the invention has been described by reference to a particular illustrative embodiment thereof, many changes and modifications of the invention may become apparent to those skilled in the art without departing from the spirit and scope of the invention. It is therefore intended to include within the patent warranted hereon all such changes and modifications as may reasonably and properly be included within the scope of this contribution to the art.

What is claimed is:

1. A valve actuator comprising:
   an output shaft for connection to a valve to be operated;
   a drive motor for connection to an energy supply and which is selectively energizable to operate in alternate directions;
   switch means connected in series with said drive motor and the energy supply; and
   coupling means coupling said drive motor to said output shaft, including torque responsive means extending coaxially and radially through said output shaft for operating said switch means to open the connection between said drive motor and the energy supply upon the occurrence of a predetermined resistance to shaft rotation at said output shaft.

2. The valve actuator of claim 1, wherein said coupling means comprises:
   a gear train between said drive motor and said output shaft, and said torque responsive means comprises:
   a gear of said gear train mounted on said output shaft, said gear rotatable with respect to said output shaft upon the occurrence of said predetermined resistance,
   cam means on said gear;
   cam follower means connected to said output shaft and engaging said cam means, and
   switch operating means extending between coaxially through said output shaft said cam follwer means and said switch means for operating said switch means in response to rotation of said gear relative said output shaft.

3. The valve actuator of claim 1, wherein said output shaft includes a coaxial bore and a transverse bore intersecting said axial bore, and wherein said torque responsive means comprises:
- a gear rotatably mounted on said output shaft and driven by said drive motor;
- cam means on said gear;
- cam follower means extending through said transverse bore and engaging said cam means and normally preventing rotation of said gear about said shaft and causing mutual rotation of said gear and shaft;
- a rod movable in said coaxial bore including a first end adjacent said switch means and a second end adjacent said cam follower means, said cam follower means including a shaped surface and said second end of said rod including a complementary shaped surface; and
- biasing means urging said shaped and complementary surfaces into sliding engagement,
- said drive motor rotating said gear relative said shaft in response to said predetermined resistance of shaft rotation to operate said switch means via said cam means, said cam follower means and said rod.

4. A valve actuator comprising:
- a drive motor;
- switch means connected in series with said drive motor;
- a gear train connected to said drive motor;
- an output shaft (for connection to a valve to be operated,) said output shaft connected to said gear train and including a coaxial bore and a radial bore intersecting said coaxial bore;
- a rod slidably mounted in said coaxial bore and having a first end disposed adjacent said switch means and a second end adjacent said radial bore;
- a first cam follower having a conical surface mounted on said second end of said rod;
- bias means urging said rod in the direction of said second end; and
- a pin extending through said radial bore including a first end having a complementary shaped surface as a first cam in engagement with said conical surface and a second end having a second cam follower,
- a gear of said gear train rotatably mounted on said output shaft and including a second cam engaging said second cam follower and normally preventing relative rotation between said gear and said output shaft,
- the occurrence of a predetermined resistance to rotation of said output shaft overcoming the action of said bias means via said second and first cams and cam followers to move said rod and operate said switch means to prevent the operation of said drive motor.

5. The valve actuator of claim 4, wherein said coaxial bore includes a threaded portion, and further comprising a threaded cap in said threaded portion having a coaxial bore receiving said rod therethrough, and wherein said bias means includes spring means bearing against said cap and said first cam follower.

6. The actuator of claim 4, wherein said gear includes a central bore about said output shaft, said second cam follower includes a cylindrical member perpendicular to said pin, and said second cam includes a recess in said central bore having a shape including an elongate arcuate ramp surface developing into a circular arcuate surface.

7. An electrically energized actuator for operating a valve, comprising:
- an electric drive motor for connection to an electrical supply;
- eletrical switch means connected to said electric drive motor, said switch means normally conditioned to permit operation of said drive motor and operable to prevent operation of said drive motor;
- a gear train connected to said drive motor;
- an output shaft for connection to a valve to be operated, said output shaft connected to said gear train and including a coaxial bore and a radial bore intersecting said coaxial bore;
- a rod slidably mounted in said coaxial bore and having a first end disposed adjacent said switch means and a second end adjacent said radial bore;
- a first cam follower having a conical surface mounted on said second end of said rod;
- bias means urging said rod in the direction of said second end; and
- a pin extending through said radial bore including a first end having a complementary shaped surface as a first cam in engagement with said conical surface, and a second end having a second cam follower,
- a gear of said gear train rotatably mounted on said output shaft and including a second cam engaging said second cam follower and normally preventing relative rotation between said gear and said output shaft,
- the occurrence of a predetermined resistance to rotation of said output shaft overcoming the action of said bias means via said second and first cams and cam followers to move said rod and operate said switch means to prevent the operation of said drive motor.

8. An electrical actuator for operating a valve, comprising:
- a drive motor for connection to an electrical supply;
- electrical switch means connected to said drive motor, said switch means normally conditioned to permit operation of said drive motor and operable to prevent operation of said drive motor;
- a rotatable output shaft for connection to a valve to be operated;
- a gear train coupling said drive motor and said output shaft in a driving relationship; and
- torque responsive means connected to said gear train for sensing a predetermined resistance to rotation of said output shaft, including means extending coaxially and radially through said output shaft for operating said switch means in response to detection of such resistance.

9. An electrical actuator according to claim 8, wherein said switch means includes a normally closed switch connected in series with said motor.

10. In a valve actuator of the type wherein an output shaft to be connected to a rotatable valve stem is driven by an electric motor via a gear train, the improvement of a safety shut off mechanism, said improvement comprising:
- a switch connected to the drive motor and normally conditioned to permit operation of the drive motor, and a torque responsive device extending coaxially and radially through and connected between the output shaft and said switch and responsive to a predetermined resistance to shaft rotation to operate said switch.

11. In the valve actuator of claim 10, wherein said improvement further comprises:
a coaxial bore in the output shaft, a switch operating rod in said coaxial bore, means biasing the rod away from said switch, a radial bore in the output shaft, and means coupling the gear train to said biased rod and responsive to the predetermined resistance to overcome the bias and move said rod into operating engagement with said switch.

* * * * *